(12) United States Patent
Manago et al.

(10) Patent No.: US 9,760,695 B2
(45) Date of Patent: Sep. 12, 2017

(54) CONTENT VIEWING RESTRICTION SYSTEM

(71) Applicants: Tatsuo Manago, Kasukabe (JP); Hideki Mizukami, Tokyo (JP)

(72) Inventors: Tatsuo Manago, Kasukabe (JP); Hideki Mizukami, Tokyo (JP)

( * ) Notice: Subject to any disclaimer, the term of this patent is extended or adjusted under 35 U.S.C. 154(b) by 0 days.

(21) Appl. No.: 15/124,924

(22) PCT Filed: Aug. 13, 2015

(86) PCT No.: PCT/JP2015/002438
§ 371 (c)(1),
(2) Date: Sep. 9, 2016

(87) PCT Pub. No.: WO2016/002120
PCT Pub. Date: Jan. 7, 2016

(65) Prior Publication Data
US 2017/0017777 A1    Jan. 19, 2017

(30) Foreign Application Priority Data
Jun. 30, 2014 (JP) .................................. 2014-133646

(51) Int. Cl.
*G06F 21/00* (2013.01)
*G06F 21/10* (2013.01)
(Continued)

(52) U.S. Cl.
CPC .......... *G06F 21/10* (2013.01); *G06F 3/0623* (2013.01); *G06F 3/0655* (2013.01);
(Continued)

(58) Field of Classification Search
CPC ........... G06F 21/10; G06F 21/34; G06F 21/35
See application file for complete search history.

(56) References Cited

U.S. PATENT DOCUMENTS

| | | | |
|---|---|---|---|
| 6,865,550 B1 * | 3/2005 | Cok ...................... | G06Q 30/06 380/277 |
| 7,007,170 B2 * | 2/2006 | Morten ................... | G06F 21/10 348/E7.056 |

(Continued)

FOREIGN PATENT DOCUMENTS

| JP | 2004-234331 A | 8/2004 |
|---|---|---|
| JP | 2006-127415 A | 5/2006 |

(Continued)

OTHER PUBLICATIONS

International Search Report dated Aug. 4, 2015, issued in couterpart International Application No. PCT/JP2015/002438 (2 page).

*Primary Examiner* — Ali Shayanfar
(74) *Attorney, Agent, or Firm* — Westerman, Hattori, Daniels & Adrian, LLP

(57) ABSTRACT

A system includes a content playback apparatus, a removable media reading apparatus 20 that is provided with a nonvolatile memory 22m in which first viewing restriction information is stored, and that is detachably attached to the content playback apparatus, and a removable media in which second viewing restriction information is stored, and the removable media being detachably attached to the removable media reading apparatus, and the content playback apparatus checks the first viewing restriction information against the second viewing restriction information, and if the first viewing restriction information satisfies a condition of the second viewing restriction information, removes a playback restriction on a content stored in the removable media in a state of being restricted for playback. It is possible to restrict viewers of the content to specific target persons, and also to reduce the risk of tampering of the viewing restriction information, and increase security in content management.

7 Claims, 7 Drawing Sheets

(51) Int. Cl.
*G06F 13/00* (2006.01)
*G06F 21/34* (2013.01)
*G06F 3/06* (2006.01)
*G06F 12/02* (2006.01)
*G06F 21/35* (2013.01)

(52) U.S. Cl.
CPC ........ *G06F 3/0679* (2013.01); *G06F 12/0246* (2013.01); *G06F 13/00* (2013.01); *G06F 21/34* (2013.01); *G06F 21/35* (2013.01); *G06F 2212/7201* (2013.01)

(56) References Cited

U.S. PATENT DOCUMENTS

| | | | |
|---|---|---|---|
| 7,227,952 B2* | 6/2007 | Qawami | G06F 21/10 380/201 |
| 8,392,941 B2* | 3/2013 | Nagai | G06F 21/6218 725/104 |
| 9,014,541 B2* | 4/2015 | Kawaguchi | H04N 5/913 386/252 |
| 9,025,940 B2* | 5/2015 | Seisun | H04N 5/76 386/293 |
| 2006/0173787 A1* | 8/2006 | Weber | G06F 21/105 705/59 |
| 2007/0124251 A1* | 5/2007 | Shimizu | G06F 21/10 705/59 |
| 2011/0004826 A1* | 1/2011 | Cho | H04H 20/26 715/716 |
| 2012/0206317 A1* | 8/2012 | Wong | G06F 21/10 345/1.1 |
| 2014/0040939 A1* | 2/2014 | Kim | H04N 21/25875 725/28 |
| 2014/0359746 A1 | 12/2014 | Tezuka et al. | |
| 2015/0156270 A1* | 6/2015 | Teraoka | G06F 13/00 709/219 |
| 2016/0004849 A1* | 1/2016 | Lee | H04N 21/278 726/27 |

FOREIGN PATENT DOCUMENTS

| | | |
|---|---|---|
| JP | 2007-280244 A | 10/2007 |
| JP | 2008-59380 A | 3/2008 |
| JP | 2012-155726 A | 8/2012 |
| WO | 2013/042306 A1 | 3/2013 |

* cited by examiner

| Management information of removable media reading apparatus 20 | |
|---|---|
| Identification number of removable media reading apparatus | * * * * * * * * * * |
| Group ID | * * * * * * * * |
| View allowed level | 005 |
| Individual ID | * * * * * * |

(b)

| Management information of removable media 30 | |
|---|---|
| Media identification number | * * * * * * * * * * |
| Group ID | * * * * * * * * |
| View allowed level | 003 |
| Individual ID | * * * * * * |
| Content ID | 510 * * |
| Management server ID | * * * * * * * * * * |

| Management information of removable media reading apparatus 20 | |
|---|---|
| Identification number of removable media reading apparatus | ********** |
| Group ID | ******** |
| Individual ID | ****** |
| Project ID | ******* |

(b)

| Management information of removable media 30 | |
|---|---|
| Media identification number | *********** |
| Project ID | ******* |
| Content ID | 610** |
| View expiry date of a content | 2014/07/10 |
| Management server ID | *********** |

CONTENT VIEWING RESTRICTION SYSTEM

TECHNICAL FIELD

The present invention relates to a content viewing restriction system, a method for restricting viewing of a content, and a content viewing restriction program that restrict the viewing of a content with information stored in a removable media, and a removable media reading apparatus used in the content viewing restriction system.

BACKGROUND ART

A system is conventionally known which uses level information stored in an SD card to restrict the use of a shared personal computer (refer to Patent Document 1). The system stores, in the SD card, authentication information for permission for the use of the personal computer, policy information for restricting the operations of a user, and authorization level information indicating the authorization level of the user, permits the use of the personal computer by the personal computer checking the authentication information of the SD card against authentication information stored in the personal computer, and authenticating the authentication in restricts the personal computer to functions corresponding to the authorization level information and policy information stored in the SD card, and allows a user possessing the SD card to use the personal computer.

CITATION LIST

Patent Literature

Patent Document 1: JP-A-2004-234331

DISCLOSURE OF THE INVENTION

Problems to be Solved by the Invention

When the system of Patent Document 1 is applied, if a content is saved in a content playback apparatus such as a personal computer, the viewing of the content can be restricted to specific persons by restriction information stored in an SD card. However, according to the system, the restriction information stored in the SD card is checked against the restriction information stored in the personal computer, and one of the restriction information sets for a check needs to be stored in a storage unit built in the personal computer.

If one of the restriction information sets for a check is stored on the personal computer side, the content playback apparatus such as a personal computer is normally always open to a communication network such as the Internet in many cases although its security is protected. The risk of tampering of the one of the restriction information sets is increased. Hence, a technology is required which reduces the risk of tampering of the restriction information and restricts the viewing of a content more reliably.

The present invention is proposed considering the above problem, and an objective thereof is to provide a content viewing restriction system, a method for restricting viewing of a content, and a content viewing restriction program that can restrict viewers of a content to specific persons and also can reduce the risk of tampering of viewing restriction information and restrict the viewing, of the content more reliably, and can increase security in content management, and a removable media reading apparatus that is used in the content viewing restriction system.

Solutions to the Problems

A content viewing restriction system of the present invention includes: a content playback apparatus; a removable media reading apparatus provided with a nonvolatile memory in which first viewing restriction information, including information identifying an individual or together with the information identifying the individual, is stored, the removable media reading apparatus being configured to be detachably attached to the content playback apparatus; and a removable media in which second viewing restriction information is stored, the removable media being configured to be detachably attached to the removable media reading apparatus. The content playback apparatus recognizes the first viewing restriction information on the removable media reading apparatus, and also recognizes the second viewing restriction information on the removable media checks the first viewing restriction information against the second viewing restriction information, and upon the first viewing restriction information satisfying a condition of the second viewing restriction information, removes a playback restriction on a content corresponding to the second viewing restriction information, the content being stored in the removable media or storage unit built in the content playback apparatus in a state of being restricted for playback.

According to this, the first and the second viewing restriction information that are checked as the condition of playback of the content are stored in the removable media reading apparatus that is detachably attached to the content playback apparatus, and the removable media. Accordingly, it becomes possible to limit a state of being open to a communication network such as the Internet with security protection to a temporary state. Therefore, it is possible to restrict viewers of the content to specific target persons, and also to reduce the risk of tampering of the viewing restriction information and restrict the viewing of the content more reliably. Security in content management, can be increased. Moreover, it is unnecessary to internally set the viewing restriction information for a check for each content playback apparatus. As long as it is a content playback apparatus that can perform a viewing restriction process in accordance with a program, it can be used, and versatility is excellent. Moreover, it is possible to handle both of a viewing restriction on a content stored in the removable media and a viewing restriction on a content stored in the content playback apparatus. Moreover, the first viewing restriction information dedicated for an individual is stored not in the removable media that is easy to become lost but in the removable media reading apparatus that is hard to become lost. Accordingly, it is possible to prevent a user from being disallowed for a view due to the loss, and also eliminate the need for collective storage aimed at preventing the loss.

In the content viewing restriction system of the present invention, the first viewing restriction information is stored in the nonvolatile memory in a state of being restricted for access, and the second viewing restriction information is stored in the removable media in the state of being restricted for access.

According to this, the tampering of the first and the second viewing restriction information by a third party or a viewer himself/herself can be prevented more reliably. The security in content management can be further increased.

In the content viewing restriction system of the present invention, each of the first viewing restriction information and the second viewing restriction information includes at least information on a view allowed level, and upon the view allowed level of the first viewing restriction information being equal to or more than the view allowed level of the second viewing restriction information, the content playback apparatus removes the playback restriction on the content corresponding to the second viewing restriction information, the content being stored in the state of being restricted for playback.

According to this, the viewing of a content can be restricted to a group of authorized persons such as persons at a certain grade or higher in a company and persons involved in a specific project, and also a group of authorized persons who are allowed to view each content can be flexibly set for the content. Contents can be hierarchically managed according to what the content includes and the degree of importance.

In the content viewing restriction system of the present invention, each of the first viewing restriction information and the second viewing restriction information includes a group ID identifying a group and the information on the view allowed level, and upon the group ID of the first viewing restriction information matching the group ID of the second viewing restriction information, and the view allowed level of the first viewing restriction information being equal to or more than the view allowed level of the second viewing restriction information, the content playback apparatus removes the playback restriction on the content corresponding to the second viewing restriction information, the content being stored in the removable media in the state of being restricted for playback.

According to this, persons who are allowed to view a content are restricted to persons belonging to a specific group such as a company. The security in content management can be further increased. If the content is stored in the removable media, also when the removable media becomes lost and is acquired by a third party, the third party can be reliably prevented from viewing the content. Moreover, when the content and the second viewing restriction information are stored in the removable media to be distributed within the company or the like, it becomes possible to store and distribute uniform information setting the second viewing restriction information not as information for a specific individual but as information for a group. Therefore, it is possible to bring efficiency to an information setting operation on the removable media and increase the convenience of distribution of the removable media.

In the content viewing restriction system of the present invention, the content playback apparatus deletes or disables playback of the content corresponding to a view expiry date stored in the removable media in response to recognition that the view expiry date is due.

According to this, the viewing of a content is disabled in synchronization with a view expiry date such as an end date of a project to prevent the accumulation of contents allowed to be viewed. Accordingly the security in it the content management can be further increased.

In the content viewing restriction system of the present invention, the content playback apparatus is connected to a management server via a communication network, and the content playback apparatus transmits an access log of a content played back to the management server.

According to this it becomes possible on the management server side, for example, to grasp whether or not a content was played back and the date and time of playback of a content, to check whether or not a content is viewed at appropriate timings with appropriate frequency, to grasp contents with high demand and interest and contents with low necessity, and to recognize a content being abnormal in the timing and frequency of a view. It is possible to promote a further increase in security in content management and the understanding of demand trends of contents.

In the content viewing restriction system of the present invention, in response to a deletion or playback disabling request of the management server connected via the communication network, the content playback apparatus determines whether or not a management server ID stored in the removable media, the management server ID identifying the management server, matches a management server ID corresponding to the request, and upon they matching, deletes or disables playback of a content corresponding to the deletion or playback disabling request.

According to this, when there arises the need to disable the viewing of a specific content due to the end of a project, an employee leaving his/her job, or the like, the viewing of the content is disabled, therefore, the security in content management can be further increased. Moreover, a management server is checked. Accordingly, it makes it possible to disable the viewing of a content only at the request of a specific management server, prevent the occurrence of a situation where the content unexpectedly becomes impossible to be viewed, and increase security in the storage of the content.

In the content viewing restriction system of the present invention, the content playback apparatus is connected to the management server via the communication network, and upon the first viewing restriction information not satisfying the condition of the second viewing restriction information the content playback apparatus transmits a playback disablement log to the management server.

According to this, it is possible to grasp a content that is requested for a view by a person who is not authorized to view the content, an individual for whom playback is frequently disabled, and the like, and to aid in content management such as the setting of the view allowed level for a content and an increase in security.

A method for restricting viewing of a content of the present invention is a method for restricting viewing of a content, the method restricting the viewing of a content in a content playback apparatus, and includes: a first step of the content playback apparatus recognizing first viewing restriction information, including information identifying an individual or together with the information identifying the individual, stored and held by a removable media reading apparatus detachably attached to the content playback apparatus, and also recognizing second viewing restriction information stored and held by a removable media detachably attached to the removable media reading apparatus; and a second step of the content playback apparatus checking the first viewing restriction information against the second viewing restriction information, and upon the first viewing restriction information satisfying a condition of the second viewing restriction information, removing a playback restriction on a content corresponding to the second viewing restriction information, the content being stored in the removable media or a storage unit built in the content playback apparatus in a state of being restricted for playback.

According to this, the first and the second viewing restriction information that are checked as the condition of playback of the content are stored in the removable media reading apparatus that is detachably attached to the content playback apparatus, and the removable media. Accordingly, it becomes possible to limit a state of being open to a communication network such as the Internet with security protection to a temporary state. Therefore, it is possible to restrict viewers of the content to specific target persons, and also to reduce the risk of tampering of the viewing restriction information and restrict the viewing, of the content more reliably. Security in content management can be increased. Moreover, it is unnecessary to internally set the viewing restriction information for a check for each content playback apparatus. As long as it is a content playback apparatus that can perform a viewing restriction process in accordance with a program, it can be used and versatility is excellent. Moreover, it is possible to handle both of a viewing restriction on a content stored in the removable media and a viewing restriction on a content stored in the content playback apparatus. Moreover, the first viewing restriction information dedicated for an individual is stored not in the removable media that is easy to become lost but in the removable media reading apparatus that is hard to become lost. Accordingly, it is possible to prevent a user from being disallowed for a view due to the loss, and also eliminate the need for collective storage aimed at preventing the loss.

In the method for restricting viewing of a content of the present invention, the second step includes determining whether or not a view allowed level of the first viewing, restriction information is equal to or more than a view allowed level of the second viewing restriction information, and upon the view allowed level of the first viewing, restriction information being equal to or more than the view allowed level of the second viewing restriction information, removing the playback restriction on the content corresponding to the second viewing restriction information, the content being stored in the state of being restricted for playback.

According to this, the viewing of a content can be restricted to a group of authorized persons such as persons at a certain grade or higher in a company and persons involved in a specific project, and also a group of authorized persons who are allowed to view each content can be flexibly set for the content. Contents can be hierarchically managed according to what the content includes and the degree of importance.

In the method for restricting viewing of a content of the present invention, the second step includes determining whether or not a group ID of the first viewing restriction information matches a group ID of the second viewing restriction information, and whether or not the view allowed level of the first viewing restriction information is equal to or more than the view allowed level of the second viewing restriction information, and upon the group ID of first viewing restriction information matching the group ID of the second viewing restriction information, and the view allowed level of the first viewing restriction information being equal to or more than the view allowed level of the second viewing restriction information, removing the playback restriction on the content corresponding to the second viewing restriction information, the content being stored in the removable media in the state of being restricted for playback.

According to this, persons who are allowed to view a content are restricted to persons belonging to a specific group such as a company. The security in content management can be further increased, if the content is stored in the removable media, also when the removable media becomes lost and is acquired by a third party, the third party can be reliably prevented from viewing the content. Moreover, when the content and the second viewing restriction information are stored in the removable media to be distributed within the company or the like, it becomes possible to store and distribute uniform information setting the second viewing restriction information not as information for a specific individual but as information for a group. Therefore, it is possible to bring efficiency to an information setting operation on the removable media and increase the convenience of distribution of the removable media.

A content playback restriction program of the present invention is a content viewing restriction program for causing a content playback apparatus to function as a unit for restricting viewing of a content, the unit including: a first unit for recognizing first viewing restriction information, including, information identifying an individual or together with the information identifying the individual, stored and held by a removable media reading apparatus detachably attached to the content playback apparatus, and also recognizing second viewing restriction information stored and held by a removable media detachably attached to the removable media reading apparatus; and a second unit for checking the first viewing restriction information against the second viewing restriction information, and upon the first viewing restriction information satisfying a condition of the second viewing restriction information, removing a playback restriction on a content corresponding to the second viewing restriction information, the content being stored in the removable media or a storage unit knit in the content playback apparatus in a state of being restricted for playback.

According to this, the first and the second viewing restriction information that are checked as the condition of playback of the content are stored in the removable media reading apparatus that is detachably attached to the content playback apparatus, and the removable media. Accordingly, it becomes possible to limit a state of being open to a communication network such as the Internet with security protection to a temporary state. Therefore, it is possible to restrict viewers of the content to specific target persons, and also to reduce the risk of tampering of the viewing restriction information and restrict the viewing of the content more reliably. Security in content management, can be increased. Moreover, it is unnecessary to internally set the viewing restriction information for a check for each content playback apparatus. As long as it is a content playback apparatus that can perform a viewing restriction process in accordance with the program, it can be used, and versatility is excellent. Moreover, it is possible to handle both of a viewing restriction on a content stored in the removable media and a viewing restriction on a content stored in the content playback apparatus. Moreover, the first viewing restriction information dedicated for an individual is stored not in the removable media that is easy to become lost but in the removable media reading apparatus that is hard to become lost. Accordingly, it is possible to prevent a user from being disallowed for a view due to the loss, and also eliminate the need for collective storage aimed at preventing the loss.

In the content viewing restriction program of the present invention, the second unit includes determining whether or not a view allowed level of the first viewing restriction information is equal to or more than as view allowed level of the second viewing restriction information, and upon the view allowed level of the fast viewing restriction information being equal to or more than the view allowed level of the second viewing restriction information, removing the playback restriction on the content corresponding to the second viewing restriction information, the content being stored in the state of being restricted for playback.

According to this the viewing of a content can be restricted to a group of authorized persons such as persons at a certain grade or higher in a company and persons involved in a specific project, and also a group of authorized persons who are allowed to view each content can be flexibly set for the content. Contents can be hierarchically managed according to what the content includes and the degree of importance.

In the content viewing restriction program of the present invention, the second unit includes determining whether or not a group ID of the first viewing restriction information matches a group ID of the second viewing restriction information, and whether or not the view allowed level of the first viewing restriction information is equal to or more than the view allowed level of the second viewing restriction information, and upon the group ID of the first viewing restriction information matching the group ID of the second viewing restriction information, and the view allowed level of the first viewing restriction information being equal to or more than the view allowed level of the second viewing restriction information, removing the playback restriction on the content corresponding to the second viewing restriction information, the content being stored in the removable media in the state of being restricted for playback.

According to this, persons who are allowed to view a content are restricted to persons belonging to a specific group such as a company. The security in content management can be further increased. If the content is stored in the removable media, also when the removable media becomes lost and is acquired by a third party, the third party can be reliably prevented from viewing the content. Moreover, when the content and the second viewing restriction information are stored in the removable media to be distributed within the company or the like, it becomes possible to store and distribute uniform information setting the second viewing restriction information not as information for a specific individual but as information for a group. Therefore, it is possible to bring efficiency to an information setting operation on the removable media and increase the convenience of distribution of the removable media.

A removable media reading apparatus of the present invention is a removable media reading apparatus to be used in a system including the removable media reading apparatus configured to be detachably attached to a content playback apparatus, a removable media in which second viewing, restriction information is stored, the removable media being configured to be detachably attached to the removable media reading apparatus, and the content playback apparatus configured to recognize first viewing restriction information and also recognize the second viewing restriction information on the removable media, check the first viewing restriction information against the second viewing restriction information, and upon the first viewing restriction information satisfying a condition of the second viewing restriction information, remove a playback restriction on a content corresponding to the second viewing restriction information, the content being stored in the removable media or a storage unit built in the content playback apparatus in a state of being restricted for playback the removable media reading apparatus including a nonvolatile memory in which the first viewing restriction information, including information identifying an individual or together with the information identifying the individual, is stored in a manner of being able to be recognized on the content playback apparatus.

According to this, the first and the second viewing restriction information that are checked as the condition of playback of the content are stored in the removable media reading apparatus that is detachably attached to the content playback apparatus, and the removable media. Accordingly, it becomes possible to limit a state of being open to a communication network such as the Internet with security protection to a temporary state. Therefore, it is possible to restrict viewers of the content to specific target persons, and also to reduce the risk of tampering of the viewing restriction information and restrict the viewing of the content more reliably. Security in content management can be increased. Moreover, it is unnecessary to internally set the viewing restriction information for a check in each content playback apparatus for each content playback apparatus. As long as it is a content playback apparatus that can perform a viewing restriction process in accordance with a program, it can be used, and versatility is excellent. Moreover, it is possible to handle both of a viewing restriction on a content stored in the removable media and a viewing restriction on a content stored in the content playback apparatus. Moreover, the first viewing restriction information dedicated for an individual is stored not in the removable media that is easy to become lost but in the removable media reading apparatus that is hard to become lost. Accordingly, it is possible to prevent a user from being disallowed for a view due to the loss, and also eliminate the need for collective storage aimed at preventing the loss.

Effects of the Invention

According to the present invention, it is possible to restrict viewers of a content to specific target persons and also reduce the risk of tampering of viewing restriction information and restrict the viewing of the content more reliably; accordingly, security in content management can be increased. Moreover, it is unnecessary to internally set the viewing restriction information for a check in each content playback apparatus for each content playback apparatus, and as long as it is a content playback apparatus that can perform a viewing restriction process in accordance with a program, it can be used, and versatility is excellent. Moreover, it is possible to handle both of a viewing restriction on a content stored in a removable media and a viewing restriction on a content stored in the content playback apparatus. Moreover, first viewing restriction information dedicated for an individual is stored not in the removable media that is easy to become lost but in a removable media reading apparatus that is hard to become lost. Accordingly, it is possible to prevent a user from being disallowed for a view due to the loss, and also eliminate the need for collective storage aimed at preventing the loss.

BRIEF DESCRIPTION OF THE DRAWINGS

FIG. 2(a) is a diagram illustrating management information stored in a removable media reading apparatus according to the first embodiment, and FIG. 2(b) is a diagram illustrating management information stored in a removable media according to the first embodiment.

FIG. 5(a) is a diagram illustrating management information stored in a removable media reading apparatus in a content viewing restriction system according to a second embodiment of the present invention, and FIG. 5(b) is a diagram illustrating management information stored in a removable media according to the second embodiment.

MODES FOR CARRYING OUT THE INVENTION

[Content Viewing Restriction System of First Embodiment]

Figure 1:
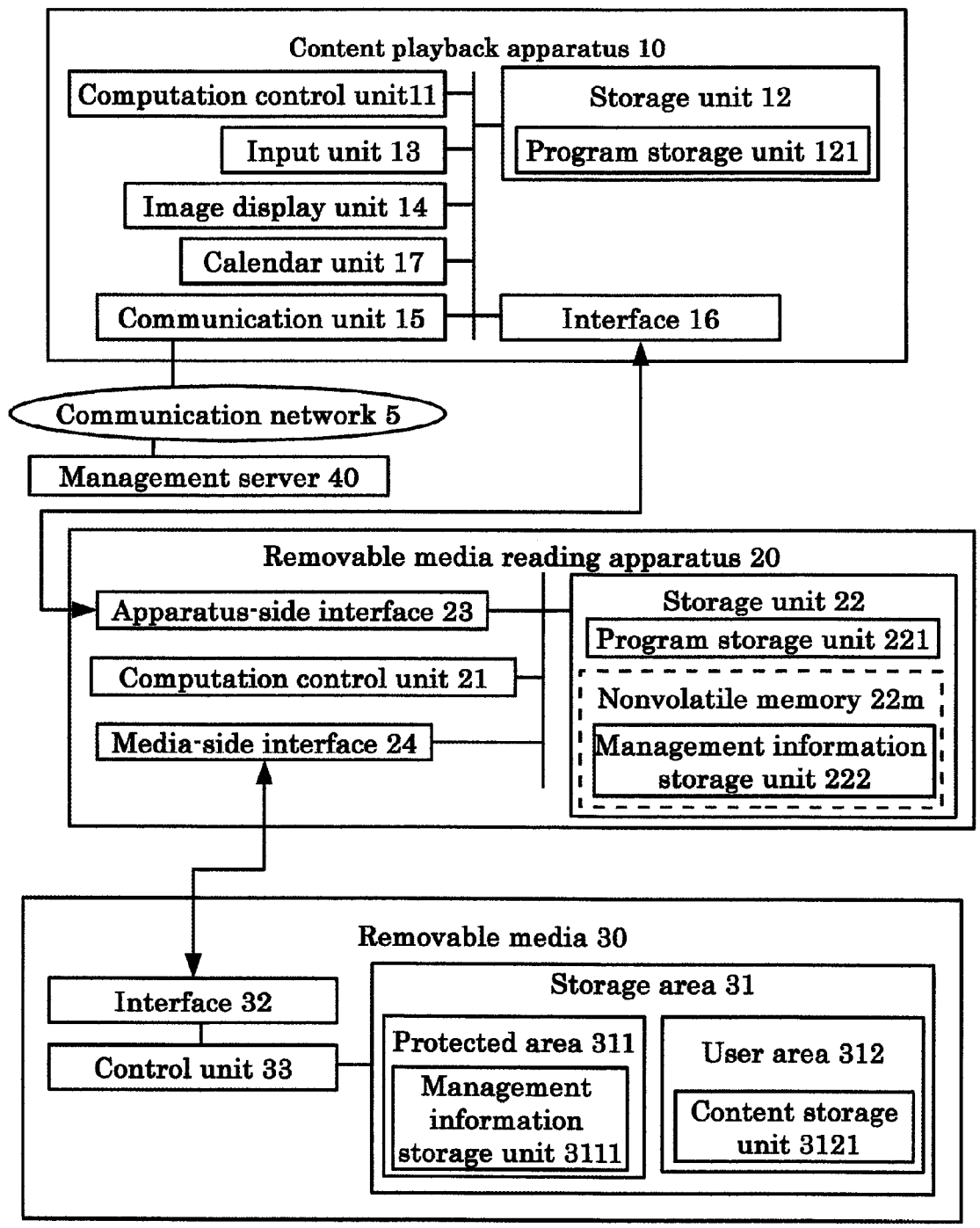
FIG. 1 is a block diagram illustrating the entire configuration of a content viewing restriction system according to a first embodiment of the present invention.

As illustrated in FIG. 1, a content viewing restriction system according to a first embodiment of the present invention includes a content playback apparatus 10, a removable media reading apparatus 20 that is detachably attached to the content playback apparatus 10, a removable media 30 that is detachably attached to the removable media reading apparatus 20, and a management server 40 that is connected to the content playback apparatus 10 via an internal, for example, in-house, or external, for example, the Internet, and internal communication network 5, and operates in accordance with predetermined control programs.

The content playback apparatus 10 is an apparatus that can play back a content and execute a content viewing process described below, for example, a multifunctional mobile terminal such a as smartphone, or a playback-only terminal and a personal computer. The content playback apparatus 10 includes a computation control unit 11 such as a CPU, a storage unit 12 composed of a ROM, a RAM, a hard disk, and the like, an input unit 13 such as a touch-screen, a keyboard, and a mouse, an image display unit 14 such as a liquid crystal display a communication unit 15 that establishes a communication connection with the management server 40 and the like via the communication network 5, an interface 16, such as a USB port, that communicates with the removable media reading apparatus 20 that can be detachably attached to the interface 16, and a calendar unit 17 that measures a date and time.

The storage unit 12 includes, in a hard disk or the like, a program storage unit 121 in which predetermined control programs such as a content viewing restriction program to execute the content viewing process and a content deletion process, which are described below, and a content playback program that allows playback of a content are stored. The computation control unit 11 executes predetermined processes in accordance with the predetermined control programs such as the content viewing restriction program and the content playback program.

The removable media reading apparatus 20 is, for example, a card reader such as an SD card reader. The removable media reading apparatus 20 includes a computation control unit 21 such as a CPU, a storage unit 22 composed of a nonvolatile memory 22m in addition to a normal ROM and RAM, an apparatus-side interface 23, such as a USB port, that can be detachably attached to the content playback apparatus 10 and communicates with the content playback apparatus 10, and a media-side interface 24, such as a card slot, that communicates with the removable media 30 that can be detachably attached to the media-side interface 24.

The storage unit 22 includes, in a ROM or the like, a program storage unit 221 in which a control program for executing a normal reading operation of the removable media 30 is stored. Moreover, management intonation including viewing restriction information corresponding to first viewing restriction information is stored in a management information storage unit 222 in the nonvolatile memory 22m of the storage unit 22. The management information including the viewing restriction information is stored in the nonvolatile memory 22m in a state of being encrypted with an encryption key and being restricted for access. The management information can be accessed and rewritten only when the encryption key is released by a predetermined write program. The nonvolatile memories provided to the removable media reading apparatus 20 also include a nonvolatile memory that is electrically connected to the removable media reading apparatus 20, in addition to the built-in nonvolatile memory 22m. The viewing restriction information corresponding to the first viewing restriction information or the management information including the viewing restriction information can also be stored in the nonvolatile memory that is connected to the removable media reading apparatus 20.

The removable media 30 is for example, a small memory card such as an SD card. The removable media 30 includes a storage area 31, an interface 32 being a circuit that communicates with the removable media reading apparatus 20, and a control unit 33 being a circuit that accesses the storage area 31 in accordance with a request input by the content playback apparatus 10. The storage area 31 includes a protected area 311 that can be accessed only by a process in accordance with a specific program such as the content viewing restriction program of the content playback apparatus 10, and a user area 312 that can be freely accessed by a process in accordance with a normal program such as the content playback program of the content playback apparatus 10.

Management information including viewing restriction information corresponding to second viewing restriction information is stored in a management information storage unit 3111 in the protected area 311 of the storage area 31. The management information including the viewing restriction information is stored in the protected area 311 that is protected to a high level, and accordingly is stored in the removable media 30 in the state of being restricted for access, and can be accessed and rewritten only when the access restriction is removed by a predetermined write program. The management information including the viewing restriction information corresponding to the second viewing restriction information can be stored in the removable media 30 in a state of being appropriately restricted for access by, for example, being stored in the user area 312 in the state of being encrypted with an encryption key and being restricted for access.

A content including a document, a moving image, a still image, audio, or an appropriate combination thereof, corresponds to the second viewing restriction information, and is preferably stored in a content storage unit 3121 in the user area 312 in a state of being copy-protected by, for example, CPRM, AACS, CPXM or AES. The content is stored in a state of being restricted for playback, and can be played back only when the playback restriction on the content is removed by, for example, generating a decryption key of the encrypted content, in the content viewing restriction process of the content playback apparatus 10.

A description is given of examples of the management information stored in the nonvolatile memory 22m of the removable media reading apparatus 20 and the management information stored in the protected area 311 of the removable media 30. As illustrated in FIG. 2(a), the management information stored in the nonvolatile memory 22m of the removable media reading apparatus 20 includes a reading apparatus identification number that identifies the removable media reading apparatus 20, such as an SD card reader, a group ID that identifies as group, such as a company number, as view allowed level that specifies the level of a content allowed, to be viewed according to the grade such as a job title, or the like, and an individual ID that identifies an individual, such as an employee number that identifies an employee. In this example, the first viewing restriction information includes the group ID, the view allowed level, and the individual ID.

As illustrated in FIG. 2(b), the management information stored in the protected area 311 of the removable media 30 includes a media identification number that identifies the removable media 30 such as an SD card, a group ID that identifies a group, such as a company number, a view allowed level that specifies a view allowed level of a corresponding content, an individual ID that identifies an individual, such as an employee number that identifies an employee, a content ID that identifies the corresponding content, and a management server ID that identifies the management server 40 that has the authorization to delete or disable the playback of the corresponding content, and is also transmitted an access log of a content played back. In this example, the second viewing restriction information includes the group ID, the view allowed level, and the individual ID.

Next, a description is given of the content viewing process according to the first embodiment. Firstly, the removable media reading apparatus 20 is attached to the content playback apparatus 10. The removable media 30 is attached to the removable media reading apparatus 20. The content playback apparatus 10 is enabled to access the information stored in the nonvolatile memory 22m of the removable media reading apparatus 20 and the information stored in the storage area 31 of the removable media 30. The content viewing restriction program is then started on the content playback apparatus 10.

Figure 3:
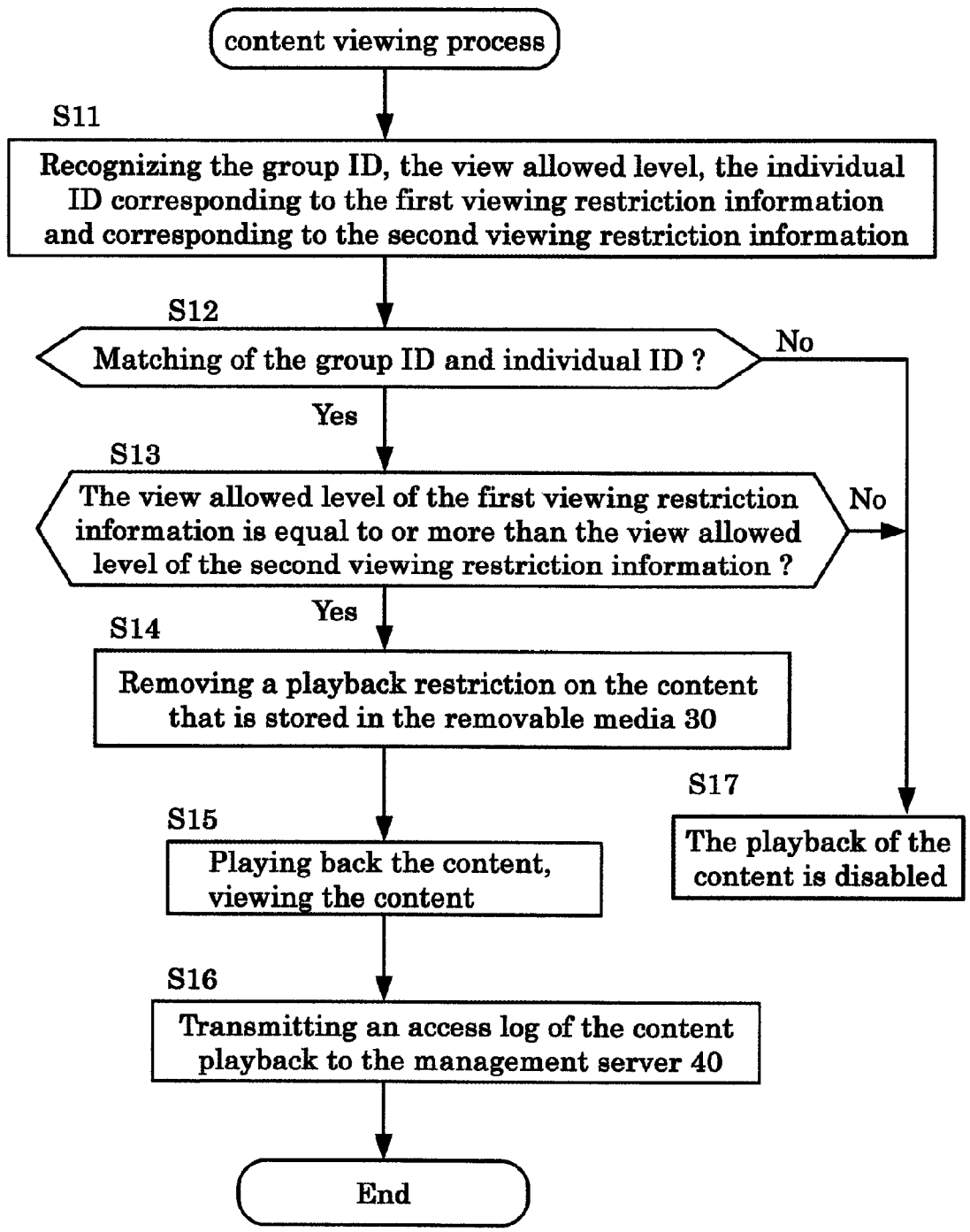
FIG. 3 is a flowchart illustrating a content viewing process according to the first embodiment.

As illustrated in FIG. 3, the computation control unit 11 that operates in accordance with the content viewing restriction program of the content playback apparatus 10, automatically or in response to the input of a viewing request from the input unit 13, recognizes the group ID, the view allowed level, and the individual ID, which correspond to the first viewing restriction information stored and held in the nonvolatile memory 22m by the removable media reading apparatus 20, and also recognizes the group ID, the view allowed level, and the individual ID, which correspond to the second viewing restriction information stored and held in the storage area 31 by the removable media 30 (S11). Moreover, the content ID of the management information corresponding to the second viewing restriction information is recognized. The management server 40 is accessed to verify that there is no deletion request to a content corresponding to the content ID.

After verifying that there is no deletion request, the computation control unit 11 checks the first viewing restriction information against the second viewing restriction information, and determines whether or not the first viewing restriction information satisfies conditions on the second viewing restriction information. In this example, the group ID and individual ID of the first viewing restriction information of the removable media reading apparatus 20 is checked against the group ID and individual ID of the second viewing restriction information of the removable media 30 to determine whether or not they match, and also determine whether or not the view allowed level of the first viewing restriction information is equal to or more than the view allowed level of the second viewing restriction information (in the example of FIGS. 2(a) and 2(b), whether or not 005 in the first viewing restriction information is a number equal to or more than 003 in the second viewing restriction information) (S12, S13).

If the first viewing restriction information satisfies the conditions of the second viewing restriction information, the computation control unit 11 follows the content viewing restriction program, recognizes the content corresponding to the content ID of the management information corresponding to the second viewing restriction information, and removes a playback restriction on the content that is stored in the removable media 30 in the state of being restricted for playback by encryption and the like, by, for example, generating a decryption key (S14). In this example, assuming that the conditions are satisfied if the group ID and individual ID of the first viewing restriction information match the group ID and individual ID of the second viewing restriction information, and the view allowed level of the first viewing restriction information is equal to or more than the view allowed level of the second viewing restriction information, the playback restriction on the content is removed.

The computation control unit 11 subsequently displays, on the image display unit 14, a list of names of one or more contents corresponding to the content. IDs from which the playback restriction has been removed, in accordance with the content viewing restriction program or the content playback program working with the content viewing restriction program. Furthermore, the computation control unit 11 plays back a specified content in response to the input to specify the content in accordance with the content playback program, and allows a user to view the content (S15). If there is one content stored in the removable media 30, the computation control unit 11 may automatically play back the content corresponding to the content ID from which the playback restriction has been removed, in accordance with the content viewing restriction program or the content playback program working with the content viewing restriction program, and allow the user to view the content.

Furthermore, in accordance with the content viewing restriction program, the computation control unit 11 of the content playback apparatus 10 recognizes information that identifies the content, such as the content ID of the played back content, and also recognizes the date and time of the playback of the content from the calendar unit 17, and transmits the information identifying the content and the content playback date and time as an access log to the management server 40 (S16). The access log received from the content playback apparatus 10 is stored in a storage unit, such as a hard disk, of the management server 40 in such a manner as to be able to be extracted if necessary.

Moreover, in the check of the first viewing restriction information against the second viewing restriction information and the determination about the satisfaction of the conditions, if the group IDs or individual IDs do not match, or if the view allowed level of the first viewing restriction information is less than the view allowed level of the second viewing restriction information, the playback restriction on the content is not removed. Accordingly, the playback of the content is disabled so that the content cannot be viewed (S17). At this point in time it can also be configured such that, in accordance with the content viewing restriction program, the computation control unit 11 transmits the date and time when the playback was disabled, and required information such as the individual IDs and the content IDs, which are stored in the removable media reading apparatus 20 and the removable media 30 as a playback disablement log to the management server 40, and the management server 40 receives the playback disablement log to store it in a viewable manner. Consequently, it is possible to grasp a content that is requested for a view by a person who is not authorized to view the content, an individual for whom playback is frequently disabled, and the like, and to aid in content management such as the setting of the view allowed level for a content and an increase in security.

It is also preferable to be configured such that while the group ID, the view allowed level, and the individual ID are stored in the nonvolatile memory 22*m* of the removable media reading apparatus 20, the group ID and the view allowed level are stored in the storage area 31 of the removable media 30, the group ID and view allowed level of the removable media reading apparatus 20 is used as the first viewing restriction information, and the group ID and view allowed level of the removable media 30 as the second viewing restriction information; and information that identifies an individual is not stored in the management information of the removable media 30. Consequently, when the content and the second viewing restriction information are stored in the removable media 30 to be distributed within a company or the like, it becomes possible to store and distribute uniform information setting the second viewing restriction information not as information for a specific individual but as information for a group. Therefore, it is possible to bring efficiency to an information setting operation on the removable media 30 and increase the convenience of distribution of the removable media 30.

In this case, in accordance with the content viewing restriction program, the computation control unit 11 makes a determination or whether or not the group ID of the first viewing restriction information matches the group ID of the second viewing restriction information, and a determination of whether or not the view allowed level of the first viewing restriction information is equal to or more than the view allowed level of the second viewing restriction information, and if the group ID of the first viewing restriction information matches the group ID of the second viewing restriction information, and also if the view allowed level of the first viewing restriction information is equal to or more that the view allowed level of the second viewing restriction information, executes the process of removing the playback restriction on the content corresponding to the second viewing restriction information, the content being stored in the removable media in the state of being restricted for playback.

Figure 4:
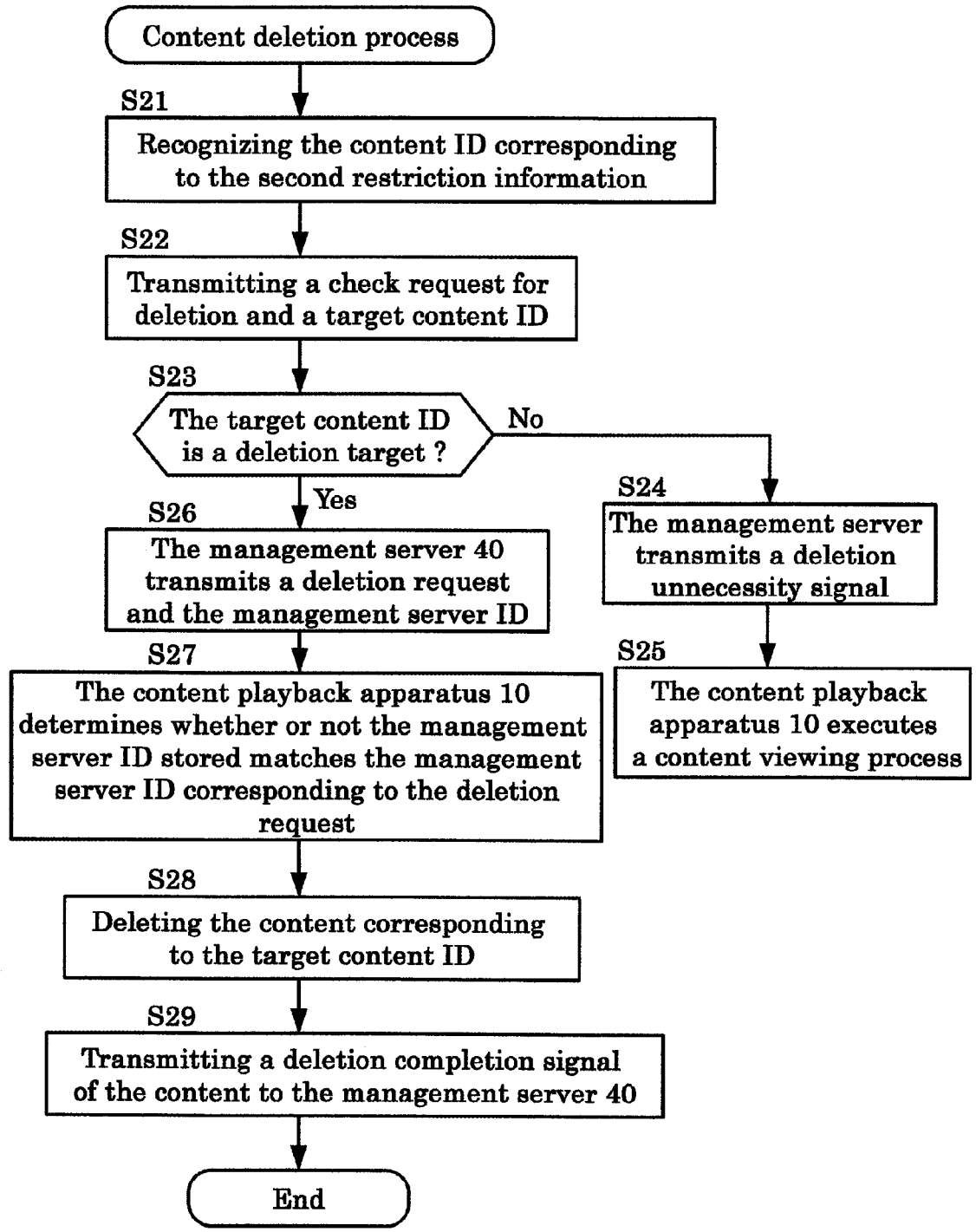
FIG. 4 is a flowchart illustrating a content deletion process based on a request of a management server according to the first embodiment.

Next, a description is given of a process of deleting content based on a request of the management server according to the first embodiment. As described above, in the state where the removable media reading apparatus 20 is attached to the content playback apparatus 10, the removable media 30 is attached to the removable media reading apparatus 20, and the content viewing restriction program is in operation on the content playback apparatus 10, as illustrated in FIG. 4, the computation control unit 11 of the content playback apparatus 10 follows the content viewing restriction program, recognizes the content ID corresponding to the second restriction information stored in the storage area 31 of the removable media 30 in response to the communication connection established by the attachment of the removable media 30, the start of the content viewing restriction program, the input of a viewing request from the input unit 13, or the like (S21), and accesses the management server 40 that is identified with a management server ID to transmit a check request for deletion and a target content ID (S22).

The management server 40 receives the check request for deletion and the target content ID, checks a table of content IDs targeted for deletion, the table being stored in the storage unit, and determines whether or not the target content ID is a deletion target (S23). If the target content ID is not a deletion target, a deletion unnecessity signal indicating that the target content ID is not requested to be deleted is transmitted to the content playback apparatus 10 (S24). The content playback apparatus 10 executes the content viewing restriction process of S11 to S15 or S12 to S15 (S25).

If the target content ID is a deletion target, the management server 40 transmits to the content playback apparatus 10, a deletion request to request the deletion of the content with the target content ID (S26). The computation control unit 11 of the content playback apparatus 10 follows the content viewing restriction program, and determines whether or not the management server ID that identifies the management server 40 and is stored in the removable media 30 matches the management server ID corresponding to the deletion request, in response to the deletion request of the content with the target content ID (S27). If they match, the computation control unit 11 of the content playback apparatus 10 deletes the content corresponding to the target content ID, the content being stored in the storage area 31 of the removable media 30 (S28). If they do not match, deletion is not performed. Upon completing the deletion, the computation control unit 11 follows the content viewing restriction program, transmits a deletion completion signal, the content ID of the deleted content, and the media identification number of the removable media 30 to the management server 40 identified by the management sewer ID, and on the management sewer 40 side, the media identification number and the content ID of the content deleted are brought into correspondence, and stored and saved as deletion completion information (S29).

When the content of the content ID corresponding to the second viewing restriction information has been deleted, contents that can be viewed by the content viewing process are contents that correspond to the remaining content IDs and have not been deleted, or there remains no content that can be viewed. The process of disabling the playback of a content can also be used instead of the content deletion process. In this case, the playback disabling process is executed, the playback disabling process including a check request for the disabling of playback to the management server 40, a check against a content ID targeted for the disabling of playback, determination, the transmission of a playback enabling signal or playback disabling request and a management server ID, a determination about the matching of management server and encryption of a content corresponding to the target content ID with an encryption key for disabling playback, and as process of, for example, bringing the content ID for which playback has been disabled into correspondence with a media identification number to store and save it as playback disablement completion information is performed in the management server 40.

In the content viewing restriction system according to the first embodiment, the first and the second viewing restriction that are checked as the conditions of the playback of a content are stored in the removable media reading apparatus 20 that are attached to and detached from the content playback apparatus 10, and the removable media 30. Accordingly, a state of being open to a communication network such as the Internet with security protection can be limited to a temporary state. Therefore, it is possible to restrict viewers of a content to specific target persons, and also to reduce the risk of tampering of the viewing restriction information by network access, and restrict the viewing of the content more reliably. Accordingly, the security in content management can be increased. Moreover, it is unnecessary to internally set the viewing restriction information for a check for each content playback apparatus 10. As long as it is the content playback apparatus 10 that can perform the viewing restriction process in accordance with the program, it can be used, and versatility is excellent.

Moreover, the first viewing restriction information is stored in the nonvolatile memory 22m in the state of being restricted for access, and the second viewing restriction information is stored in the removable media 30 in the state of being restricted for access. Accordingly, the tampering of the first and the second viewing restriction information by a third party and a viewer himself/herself can be prevented more reliably. The security in content management can be further increased. Moreover, the first viewing restriction information dedicated for an individual is stored not in the removable media 30 such as an SD card that is easy to become lost but in the removable media reading apparatus 20 that is hard to become lost. Accordingly, it is possible to prevent a user from being disallowed for a view due to the loss, and also eliminate the need for complicated and time-consuming operations such as collectively storing recording media in a specific location to prevent the loss of the viewing restriction information dedicated for an individual, and each employee taking it out from and returning it to the location.

Moreover, the viewing of a content can be restricted to a group of authorized persons such as persons at a certain grade or higher in a company and persons involved in a specific project, and also a group of authorized persons who are allowed to view each content can be flexibly set for the content. Contents can be hierarchically managed according to what the content includes and the degree of importance. Moreover, persons who are allowed to view a content are restricted to persons belonging to a specific group such as a company. The security in content management can be further increased. Also when the removable media 30 becomes lost and is acquired by a third party, the third party can be reliably prevented from viewing the content stored in the removable media 30.

Moreover, the content playback apparatus 10 transmits an access log of a content played back to the management server 40 to store the access log in the management server 40. Accordingly, it is possible on the management server 40 side, for example, to grasp whether or not a content was played back and the date and time of playback of a content, to check whether or not a content is viewed at appropriate timings with appropriate frequency, to grasp contents with high demand and interest and contents with low necessity and to recognize a content being abnormal in the timing and frequency of a view. It is possible to promote a further increase in security in content management and the understanding of demand trends of contents.

Moreover, a content is deleted or disabled for playback in response to a deletion or playback disabling request of the management server 40. Accordingly, when there arises the need to disable the viewing of a specific content due to the end of a project, an employee leaving his/her job, or the like, the viewing of the content is disabled; therefore, the security in content management can be further increased. Moreover, a management server ID that has transmitted a request in the deletion or playback disabling process is checked. Accordingly, it makes it possible to disable the viewing of as content only at the request of a specific management server 40, prevent the occurrence of a situation where the content unexpectedly becomes impossible to be viewed, and increase security in the storage of the content.

[Content Viewing Restriction System of Second Embodiment]

A content viewing restriction system according to a second embodiment of the present invention has the same entire configuration of the first embodiment illustrated in FIG. 1, but is different from the first embodiment in the respect that as content viewing control program stored in the program storage unit 121 of the storage unit 12 of the content playback apparatus 10, the management information including the viewing restriction information corresponding to the first viewing restriction information stored in the nonvolatile memory 22m of the removable media reading apparatus 20, and the management information including the viewing restriction information corresponding to the second viewing restriction information stored in the protected area 311 of the storage area 31 of the removable media 30 are different.

As illustrated in FIG. 5(a), the management information stored in the nonvolatile memory 22m of the removable media reading apparatus 20 according to the second embodiment includes a reading apparatus identification number that identifies the removable media reading apparatus 20 such as an SD card reader, a group ID that identifies a group, such as a company number, an individual ID that identifies an individual, such as an employee number that identifies an employee, and a project ID that identifies a project. In this example, the first viewing restriction information includes the project ID.

As illustrated in FIG. 5(b), the management information stored in the protected area 311 of the removable media 30 according to the second embodiment includes a media identification number that identifies the removable media 30 such as an SD card, a project ID that identifies a project, a content ID that identifies a corresponding content, a view expiry date of a content that is identified by the content ID, and a management server ID that identifies the management server 40 that has the authorization to delete or disable the playback of the corresponding content and is transmitted an access log of a content played back. In this example, the second viewing restriction information includes the project ID.

Next, a content viewing process according to the second embodiment is described. Firstly, as in the first embodiment, the removable media reading apparatus 20 is attached to the content playback apparatus 10. The movable media 30 is attached to the removable media reading apparatus 20. The content playback apparatus 10 is enabled to access the information stored in the nonvolatile memory 22m of the removable media reading apparatus 20 and the information stored in the storage area 31 of the removable media 30. The content viewing restriction program is then started on the content playback apparatus 10.

Figure 6:
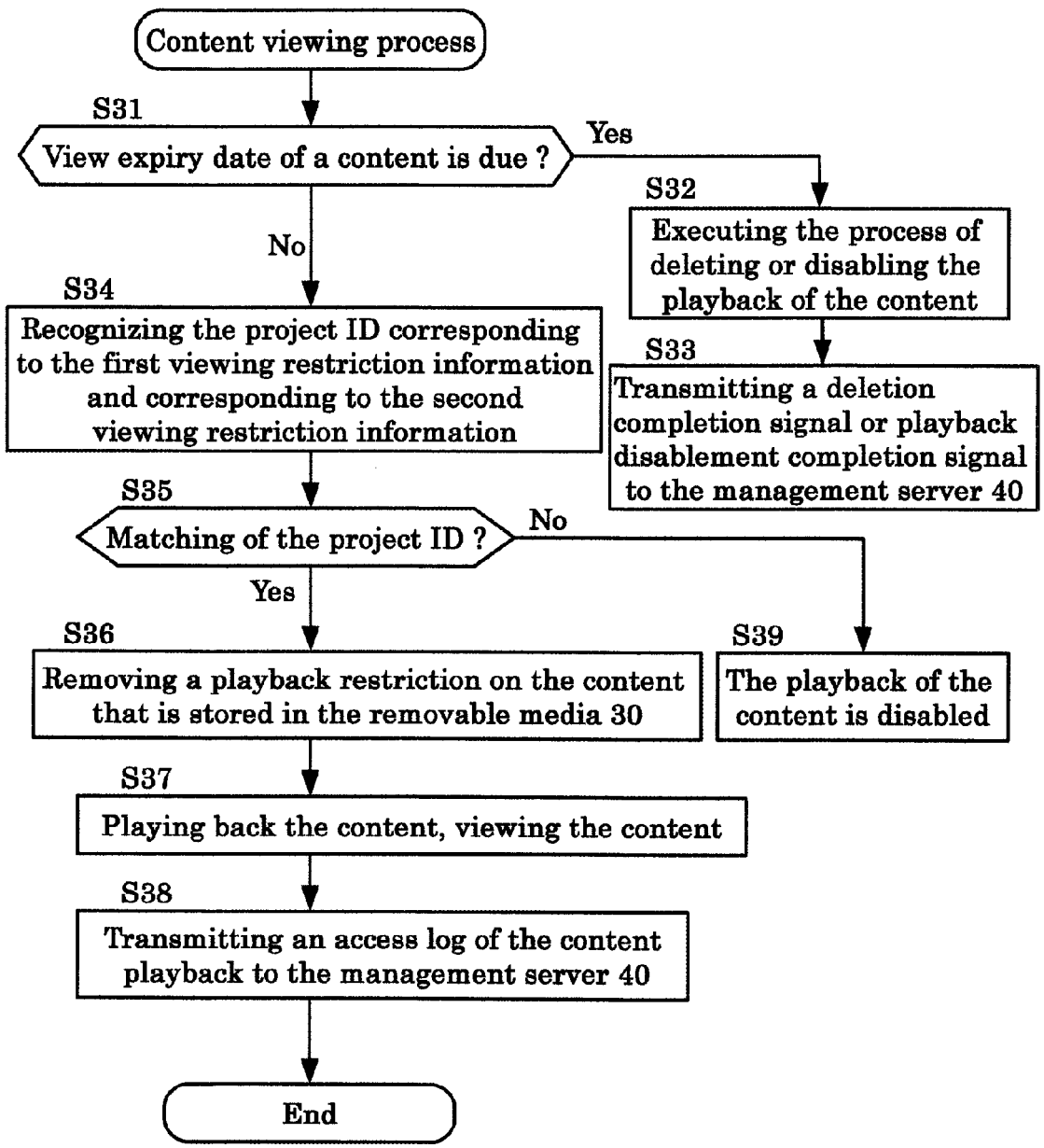
FIG. 6 is a flowchart illustrating a content viewing process according to the second embodiment.

As illustrated in FIG. 6, the computation control unit 11 that operates in accordance with the content viewing restriction program of the content playback apparatus 10 makes comparisons between a date and time recognized by the calendar unit 17 and a view expiry date of a content stored in the removable media 30 in response to the communication connection established by the attachment of the removable media 30, the start of the content viewing restriction program the input of a viewing request from the input unit 13, or the like (S31), and if there is a content whose view expiry date is due, executes the process of deleting or disabling the playback of the content with a content ID corresponding to the due view expiry date (S32). Upon completing the deletion or playback disabling process, the computation control unit 11 transmits a deletion completion signal or playback disablement completion signal, the content ID of the content deleted or disabled for playback, and the media identification number of the removable media 30 to the management server 40 identified by the management server ID (S33). On the management server 40 side, the media identification number and the content ID of the content deleted or disabled for playback are brought into correspondence, and stored and saved as deletion completion information or playback disablement completion information.

If a single or a plurality of all contents are before their view expiry dates, and for remaining contents that are before their view expiry dates, the project ID is recognized which corresponds to the first viewing restriction information stored and held in the nonvolatile memory 22m by the removable media reading apparatus 20, and also the project ID is recognized which corresponds to the second viewing restriction information stored and held in the storage area 31 by the removable media 30 (S34). Moreover, the content ID of the management information corresponding to the second viewing restriction information is recognized, access is made to the management server 40 to verify that there is no deletion request or playback disabling request for the content corresponding to the content ID, and if there is a deletion request or playback disabling request, executes the deletion or playback disabling process as in the first embodiment. Also in this case, on the management server 40 side, the media identification number and the content ID of the content deleted or disabled for playback are brought into correspondence to store and save them as the deletion completion information or playback disablement completion information. On the management server 40 side, it becomes possible to collectively grasp the deletion completion information or playback disablement completion information together with those deleted or disabled for playback based on the due view expiry dates.

After it is verified on the management server 40 side that there is no deletion request or playback disabling request, the computation control unit 11 checks the first viewing restriction information against the second viewing restriction information for a content that does not require the deletion or playback disabling process, and determines whether or not the first viewing restriction information satisfies a condition of the second viewing restriction information. In this example, the project ID corresponding to the first viewing restriction information of the removable media reading apparatus 20 is checked against the project ID corresponding to the second viewing restriction information of the removable media 30 to determine whether or not they match (S35). If the project IDs do not match, the playback restriction on the content is not removed so that the content cannot be viewed.

If the first viewing restriction information satisfies the condition of the second viewing restriction information, that is, if the project ID of the first viewing restriction information matches the project ID of the second viewing restriction information, the computation control unit 11 follows the content viewing restriction program, recognizes the content corresponding to the content ID of the management information corresponding to the second viewing restriction information, and for example, generates a decryption key to remove the playback restriction on the content that is stored in the removable media 30 in a state of being restricted for playback by encryption and the like (S36).

The computation control unit 11 subsequently displays, on the image display unit 14, a list of names of one or more contents corresponding to the content IDs from which the playback restriction has been removed in accordance with the content viewing restriction program or the content playback program working with the content viewing restriction program. Furthermore, the computation control unit 11 plays back a specified content in response to the input to specify the content in accordance with the content playback program, and allows a user to view the content (S37). If there is one content stored in the removable media 30, the content may be automatically played back to allow the user to view the content as in the first embodiment.

Furthermore, in accordance with the content viewing restriction program, the computation control unit 11 of the content playback apparatus 10 recognizes information that identifies the content, such as the content ID of the content played back, and also recognizes the date and time of the playback of the content from the calendar unit 17, and transmits the information identifying the content and the content playback date and time as an access log to the management server 40 (S38). The access log received from the content playback apparatus 10 is stored in the storage unit, such as a hard disk, of the management server 40 in such a manner as to be able to be extracted if necessary.

Moreover, if the project ID of the first viewing restriction information does not match the project ID of the second viewing restriction information, the playback restriction on the content is not removed. Accordingly, the playback of the content is disabled so that the content cannot be viewed (S39). At this point, in time, as in the first embodiment, it can also be configured such that, in accordance with the content viewing restriction program, the computation control unit 11 transmits the date and time when the playback was disabled, and required information such as the individual IDs, the content IDs, and the project Ms which are stored in the removable media reading apparatus 20 and the removable media 30, as a playback disablement log to the management server 40, and the management server 40 receives the playback disablement log to store it in a viewable manner, which may be used to aid in content management such as an increase in security.

The content viewing restriction system according to the second embodiment can obtain the corresponding effects based on the configuration corresponding to the first embodiment, and also can further increase the security in content management by disabling the viewing of a content in synchronization with a view expiry date such as an end date of a project, and doubly preventing the accumulation of contents allowed to be viewed.

[Modifications of Embodiments, Etc.]

The invention disclosed in the description includes those determined by changing partial matters of each aspect and each embodiment to other matters disclosed in the description, or those determined by adding other matters disclosed in the description to the partial matters, or those conceptualized generically, which are determined by deleting the partial matters to a degree that the operations and effects can be partially obtained, within an applicable range, in addition to each aspect and each embodiment. The invention disclosed in the description also includes the following modifications.

For example, in the first and second embodiments, the case has been described in which a content to be played back is stored in the user area 312 of the removable media 30. However, a content to be played back in the viewing restriction system can also be stored in the storage unit 12 of the content playback apparatus 10 instead of the storage of the content in the user area 312.

Figure 7:
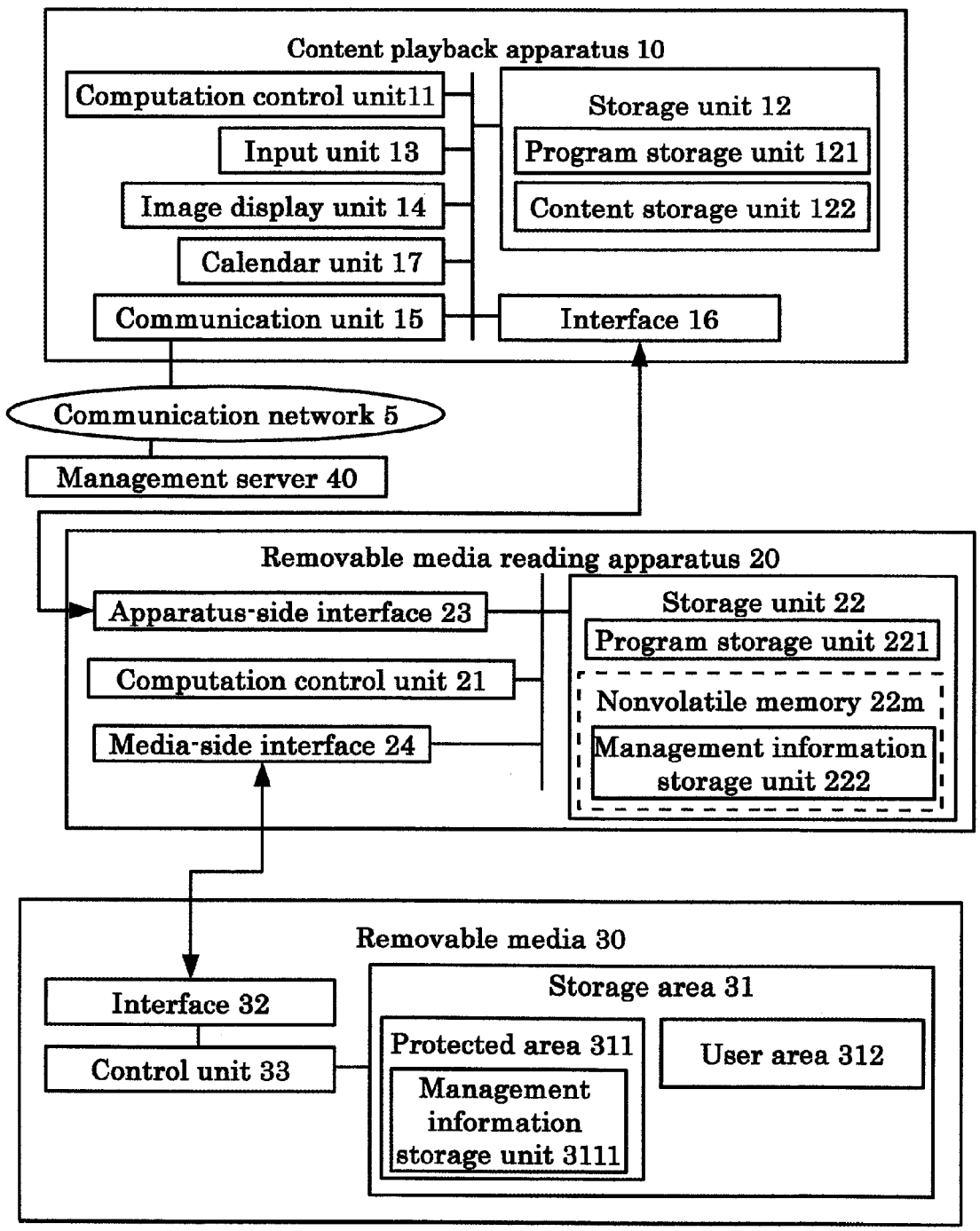
FIG. 7 is a block diagram illustrating the entire configuration of a modification of the content viewing restriction system according to the first embodiment of the present invention.

In this case, as illustrated in FIG. 7, it is configured such that the content and its content ID are stored in a content storage unit 122, such as a hard disk, of the storage unit 12 built in the content playback apparatus 10 in a state of being restricted for playback by encryption and the like, preferably in a state of being copy-protected, the second viewing restriction information is brought into correspondence with the content stored in the content playback apparatus 10 via the content ID corresponding to the second viewing restriction information of the management information stored in the removable media 30, and the playback restriction on the content with the content ID corresponding to the second viewing restriction information stored in the content playback apparatus 10 is removed by, for example, generating an encryption key, and played back if it is determined that the first viewing restriction information satisfies the condition of the second viewing restriction information in a similar process to the first and second embodiments. Also in this example, the other configurations such as transmission to and reception from the management serer 40, and deletion can be applied as in the first and second embodiments.

Moreover, in the first embodiment, a project ID may be added to the management information of the removable media reading apparatus 20, and a project ID and a view expiry date of as content may be added to the management information of the removable media 30. In the content viewing restriction system of the first embodiment, a configuration that performs the process of the second embodiment together may be added, or a view expiry date of a content may be added to the management information of the removable media 30 of the first embodiment, to perform the process of deleting or disabling the playback of the content when the expiry date is due.

Moreover, in the rental industry, the present invention can also be applied to a case where a content is stored and distributed in a removable media such as an SD card, to be viewed on a multifunctional mobile terminal such as a smartphone, a playback-only terminal, a personal computer, a television set, and the like, in addition to the management of a content such as an in-house document. Moreover, a case where a playback restriction on a content is removed by checking the view in restriction information in the present invention also includes a case where part of a content such as part of a document is restricted for playback by encryption and the like, and the playback restriction is removed, in addition to the removal of a playback restriction on the entire content.

INDUSTRIAL APPLICABILITY

The present invention can be used in a case where viewers of a content are restricted by, for example, storing materials in SD cards in a company, distributing them to employees, and allowing only the specific employees to view the materials.

DESCRIPTION OF REFERENCE SIGNS

10 Content playback apparatus
11 Computation control unit
12 Storage unit
121 Program storage unit
122 Content storage unit
13 Input unit
14 Image display unit
15 Communication unit
16 Interface
17 Calendar unit
20 Removable media reading apparatus
21 Computation control unit
22 Storage unit
221 Program storage unit
22m Nonvolatile memory
222 Management information storage unit
23 Apparatus-side interface
24 Media-side interface
30 Removable media
31 Storage area
311 Protected area
3111 Management information storage unit
312 User area
3121 Content storage unit
32 Interface
33 Control unit
40 Management server
5 Communication network

The invention claimed is:

1. A content viewing restriction system, comprising:
a content playback apparatus;
a removable media reading apparatus provided with a nonvolatile memory in which first viewing restriction information, including information identifying an individual, is stored, the removable media reading apparatus being configured to be detachably attached to the content playback apparatus; and
a removable storage media in which second viewing restriction information is stored, the removable storage media being configured to be detachably attached to the removable media reading apparatus, wherein:
the content playback apparatus recognizes the first viewing restriction information on the removable media reading apparatus, and also recognizes the second viewing restriction information on the removable storage media, and compares the first viewing restriction information against the second viewing restriction information, and upon the first viewing restriction information satisfying a condition of the second viewing restriction information, removes a playback restriction on a content corresponding to the second viewing restriction information, the content being stored in the removable storage media or a storage unit built in the content playback apparatus in a state of being restricted for playback,
the first viewing restriction information is stored in the nonvolatile memory in a state of being restricted for access, and the second viewing restriction information is stored in the removable storage media in the state of being restricted for access, and further
each of the first viewing restriction information and the second viewing restriction information includes at least information on a view allowed level, and upon the view allowed level of the first viewing restriction information being equal to or more than the view allowed level of the second viewing restriction information, the content playback apparatus removes the playback restriction on the content corresponding to the second viewing restriction information, the content being stored in the state of being restricted for playback.

2. The content viewing restriction system according to claim 1, wherein each of the first viewing restriction information and the second viewing restriction information includes a group ID identifying a group and the information on the view allowed level, and upon the group ID of the first viewing restriction information matching the group ID of the second viewing restriction information, and the view allowed level of the first viewing restriction information being equal to or more than the view allowed level of the second viewing restriction information, the content playback apparatus removes the playback restriction on the content corresponding to the second viewing restriction information, the content being stored in the removable media in the state of being restricted for playback.

3. The content viewing restriction system according to claim 1, wherein the content playback apparatus deletes or disables playback of the content corresponding to a view expiry date stored in the removable media, in response to recognition that the view expiry date is due.

4. The content viewing restriction system according to claim 1, wherein the content playback apparatus is connected to a management server via a communication network, and the content playback apparatus transmits an access log of a content played back to the management server.

5. The content viewing restriction system according to claim 1, wherein in response to a deletion or playback disabling request of a management server connected via the communication network, the content playback apparatus determines whether or not a management server ID stored in the removable storage media, the management server ID identifying the management server, matches a management server ID corresponding to the request, and upon matching, deletes or disables playback of a content corresponding to the deletion or playback disabling request.

6. The content viewing restriction system according to claim 1, wherein the content playback apparatus is connected to a management server via the communication network, and upon the first viewing restriction information not satisfying the condition of the second viewing restriction information, the content playback apparatus transmits a playback disablement log to the management server.

7. A system including:

a removable media reading apparatus configured to be detachably attached to a content playback apparatus, a removable storage media in which second viewing restriction information is stored, the removable storage media being configured to be detachably attached to the removable media reading apparatus, and the content playback apparatus configured to recognize first viewing restriction information and also recognize the second viewing restriction information on the removable storage media, compare the first viewing restriction information against the second viewing restriction information, and upon the first viewing restriction information satisfying a condition of the second viewing restriction information, remove a playback restriction on a content corresponding to the second viewing restriction information, the content being stored in the removable storage media or a storage unit built in the content playback apparatus in a state of being restricted for playback, the removable media reading apparatus comprising a nonvolatile memory in which the first viewing restriction information, including information identifying an individual, is stored in a manner of being able to be recognized on the content playback apparatus, wherein:

the first viewing restriction information is stored in the nonvolatile memory in a state of being restricted for access, and the second viewing restriction information is stored in the removable storage media in the state of being restricted for access, and further each of the first viewing restriction information and the second viewing restriction information includes at least information on a view allowed level, and upon the view allowed level of the first viewing restriction information being equal to or more than the view allowed level of the second viewing restriction information, the content playback apparatus removes the playback restriction on the content corresponding to the second viewing restriction information, the content being stored in the state of being restricted for playback.

* * * * *